US012774619B2

(12) United States Patent
Jarnicki

(10) Patent No.: US 12,774,619 B2
(45) Date of Patent: Oct. 27, 2026

(54) DOOR HANDLE

(71) Applicant: Witte Automotive GmbH, Velbert (DE)

(72) Inventor: Richard-Roman Jarnicki, Velbert (DE)

(73) Assignee: Witte Automotive GmbH, Velbert (DE)

( * ) Notice: Subject to any disclaimer, the term of this patent is extended or adjusted under 35 U.S.C. 154(b) by 0 days.

(21) Appl. No.: 19/059,443

(22) Filed: Feb. 21, 2025

(65) Prior Publication Data

US 2025/0270857 A1 Aug. 28, 2025

(30) Foreign Application Priority Data

Feb. 23, 2024 (DE) ..................... 10 2024 201 705.1

(51) Int. Cl.
*E05B 77/06* (2014.01)

(52) U.S. Cl.
CPC .................................... *E05B 77/06* (2013.01)

(58) Field of Classification Search
CPC .... E05B 77/06; E05B 79/20; Y10T 292/0979; Y10T 292/1063
USPC ........................................................... 70/101
See application file for complete search history.

(56) References Cited

U.S. PATENT DOCUMENTS 5,669,642 A * 9/1997 Kang ...................... E05B 77/06 292/336.3
6,471,262 B1 * 10/2002 Schwab .................. E05B 77/06 292/351
6,971,688 B2 * 12/2005 Drysdale ................. E05B 77/12 292/216
8,029,032 B1 * 10/2011 Yang ....................... E05B 77/06 292/336.3
8,366,159 B2 * 2/2013 Patel ....................... E05B 77/06 292/336.3
8,511,726 B2 * 8/2013 Lennhoff ................ E05B 85/16 292/336.3
8,783,742 B2 * 7/2014 Puscas .................... E05B 77/06 292/336.3
8,840,156 B2 * 9/2014 Savant .................... F16B 12/40 292/336.3
9,062,477 B2 * 6/2015 Da Deppo .............. E05B 77/06
(Continued)

FOREIGN PATENT DOCUMENTS

CN 102089487 A * 6/2011 ............... B60N 3/02
CN 105683468 A * 6/2016 ........... B60Q 1/2669
(Continued)

*Primary Examiner* — Steven A Tullia
(74) *Attorney, Agent, or Firm* — Marshall & Melhorn, LLC

(57) ABSTRACT

A door handle may have at least a handle element, a deflection element, a transmission element, a locking mechanism for locking a lock, and a handle support, to which the handle element and the deflection element are articulated. The transmission element may be coupled to the deflection element, so that upon actuation of the handle element, the deflection element can be actuated, and the lock can be unlocked thereby via the transmission element. The locking mechanism may have at least one mass lock, which, due to an accident, can be displaced into a locking position on the deflection element due to mass inertia. The locking mechanism may have a blocking device which irreversibly blocks the mass lock in the locking position.

11 Claims, 5 Drawing Sheets

(56) References Cited

U.S. PATENT DOCUMENTS

| | | | | |
|---|---|---|---|---|
| 9,574,381 | B2 * | 2/2017 | Beck | E05B 85/14 |
| 9,810,005 | B2 * | 11/2017 | Rocci | E05B 77/06 |
| 10,415,274 | B2 * | 9/2019 | Nagata | E05B 79/06 |
| 11,384,571 | B2 * | 7/2022 | Obita | E05B 83/24 |
| 12,077,994 | B2 * | 9/2024 | Obita | E05B 77/06 |
| 12,209,438 | B2 * | 1/2025 | Diez Estevez | E05B 77/06 |
| 2001/0035656 | A1 * | 11/2001 | Stuart | E05B 77/06 292/347 |
| 2009/0102206 | A1 * | 4/2009 | Lee | E05B 85/16 292/336.3 |
| 2010/0088855 | A1 * | 4/2010 | Ruse | E05B 77/06 16/412 |
| 2011/0233944 | A1 * | 9/2011 | Konchan | E05B 77/06 292/216 |
| 2011/0298228 | A1 * | 12/2011 | Lesueur | E05B 77/06 292/336.3 |
| 2012/0067657 | A1 * | 3/2012 | Lesueur | E05B 77/06 180/274 |

FOREIGN PATENT DOCUMENTS

| | | | | | |
|---|---|---|---|---|---|
| CN | 108843158 | A | * | 11/2018 | E05B 79/20 |
| CN | 110306888 | A | * | 10/2019 | E05B 77/42 |
| CN | 114059861 | A | * | 2/2022 | E05B 85/00 |
| CN | 114876292 | A | * | 8/2022 | E05B 77/06 |
| DE | 19858414 | A1 | * | 6/2000 | E05B 77/06 |
| DE | 102009013324 | A1 | | 9/2010 | |
| DE | 102009044042 | A1 | * | 3/2011 | E05B 77/06 |
| DE | 102009053553 | A1 | * | 5/2011 | E05B 85/10 |
| DE | 102011115009 | A1 | * | 4/2012 | E05B 77/06 |
| DE | 102011051328 | A1 | * | 12/2012 | E05B 77/06 |
| DE | 102012101059 | A1 | * | 8/2013 | E05B 79/06 |
| DE | 102013106618 | A1 | * | 1/2015 | E05B 85/16 |
| DE | 102014015477 | A1 | * | 4/2016 | E05B 77/06 |
| DE | 102017118489 | A1 | * | 2/2019 | E05B 77/06 |
| DE | 102021201683 | B3 | * | 3/2022 | E05B 81/76 |
| EP | 1050644 | A2 | * | 11/2000 | E05B 77/06 |
| EP | 1593802 | A1 | * | 11/2005 | E05B 77/06 |
| EP | 2818615 | B1 | * | 7/2017 | E05B 85/16 |
| EP | 4442944 | A1 | * | 10/2024 | E05B 77/06 |
| FR | 2882386 | B1 | * | 4/2007 | E05B 65/20 |
| JP | 2003013630 | A | * | 1/2003 | E05B 1/00 |
| JP | 2015004221 | A | * | 1/2015 | E05B 85/16 |
| JP | 6061092 | B2 | * | 1/2017 | E05B 85/16 |
| KR | 20090062866 | A | * | 6/2009 | E05B 85/14 |
| KR | 20130108573 | A | * | 10/2013 | E05B 83/36 |
| KR | 101869993 | B1 | * | 6/2018 | E05B 77/06 |
| WO | WO-2004059112 | A1 | * | 7/2004 | E05B 77/04 |
| WO | WO-2011051152 | A1 | * | 5/2011 | E05B 85/10 |
| WO | WO-2012028325 | A3 | * | 5/2012 | E05B 85/10 |
| WO | WO-2017130606 | A1 | * | 8/2017 | E05B 79/22 |

* cited by examiner

DOOR HANDLE

FIELD

The invention relates to a door handle for a vehicle.

BACKGROUND

In order to prevent a door lock of the door handle from being unintentionally unlocked, for example in the event of an accident when the door is subjected to a sudden impact from the outside, it is known to provide a locking mechanism in the form of a mass lock which prevents the door lock from being accidentally opened or unlocked.

The invention is based on the object of providing a door handle for a vehicle with an improved locking mechanism, which prevents unwanted unlocking of a door lock.

The object is achieved according to the invention by a door handle having the features of claim 1.

SUMMARY

The door handle according to the invention comprises at least a handle element, a deflection element, a transmission element, a locking mechanism for locking a lock, and a handle support, to which the handle element and the deflection element are articulated, wherein the transmission element is coupled to the deflection element, and wherein, upon actuation of the handle element by means of the handle element, the deflection element can be actuated and the lock can be unlocked thereby via the transmission element, wherein the locking mechanism comprises at least one mass lock, which, due to an accident, in particular in the event of an accident or an impact, can be displaced into a locking position on the deflection element due to mass inertia, and wherein the locking mechanism further comprises a blocking device, which irreversibly blocks the mass lock in the locking position.

Irreversible blocking in the locking position means that the mass lock does not pivot back on its own, but rather remains in the blocked position so that, for example, the door handle and thus a vehicle door do not open in the event of an accident. After the accident, the mass lock can be reset, for example in a garage. This means that the mass lock, for example a blocking spring such as a leaf spring, can be returned to its starting position (rest position).

The advantages achieved by the invention are in particular that a mass lock that has been triggered and is in its locking position can be blocked so that it does not become disengaged or move out of its locking position during an accident. In other words, the mass lock remains locked in its locking position by means of the blocking device. This can ensure that the vehicle door is prevented from being opened from the outside during an accident, but also after an accident.

In the normal position or rest position (starting position), the mass lock is positioned relative to the deflection element such that the mass lock does not block the deflection element and thus the transmission element coupled thereto. This makes it possible to lock and unlock the lock, in particular a door lock, by actuating the handle element.

If the door or door handle is subjected to mechanical stress, for example in the event of an accident such as a side impact, a bearing frame of the door handle and/or the mass lock may be pressed in or acted upon by mass forces or acceleration forces, whereby the mass lock moves dynamically due to its mass inertia, in particular pivots about an axis of rotation, as a result of which a locking surface of the mass lock comes into engagement with a locking opening of the deflection element and thus moves into the locking position on the deflection element. As a result, the mass lock blocks any further movement of the deflection element and thus of the transmission element in the unlocking direction so that unlocking of the lock and thus opening of the door handle is prevented.

As a result of the automatic movement of the mass lock, the blocking device, in particular a spring-loaded leaf spring, moves into a blocking position so that the mass lock is blocked in its locking position, in particular irreversibly.

In a possible development, the mass lock may comprise a unidirectional locking element and a mass element. The locking element and the mass element can be mounted so as to be rotatable about a common locking axis. For example, the locking element and the mass element can be mounted on a handle support or on a bearing bracket so as to be rotatable about the common locking axis.

Preferably, the locking element and the mass element are designed as a one-piece mass locking element. Alternatively, the locking element and the mass element may be designed separately and firmly connected to one another. In particular, the mass lock has only one locking position.

In addition, the deflection element can have a locking opening, into which the mass lock engages in a locking manner in the locking position. When the mass lock is brought into its locking position on the deflection element, the blocking device can, preferably automatically, move into a blocking position on the mass lock in order to irreversibly block the mass lock in its locking position.

The blocking device can be designed as a leaf spring, for example. The leaf spring can, for example, comprise a spring leg, which, in particular in a rest position (also called a starting position or an idle position) of the mass lock, rests with an abutment portion laterally on the mass lock in a spring-loaded manner.

When the mass lock is brought into its locking position, for example in the event of an accident, when accelerations, in particular acceleration forces, act on the vehicle and a vehicle door with the door handle, for example in the event of a side impact, the spring leg can move automatically from its lateral abutment on the mass lock into the blocking position on the mass lock. The spring leg expands and automatically moves into the blocking position on the mass lock. For example, the spring leg can comprise an extension, which, in the blocking position, irreversibly blocks the mass lock.

The deflection element can be designed as a disk-shaped locking body, in which the locking opening is arranged, into which the locking element pivots or engages. The deflection axis and the locking axis are preferably arranged perpendicular to one another.

DESCRIPTION OF THE FIGURES

Exemplary embodiments of the invention are explained in greater detail with reference to the drawings, in which.

DETAILED DESCRIPTION

Parts corresponding to one another are provided with the same reference signs in all the drawings.

Figure 1:
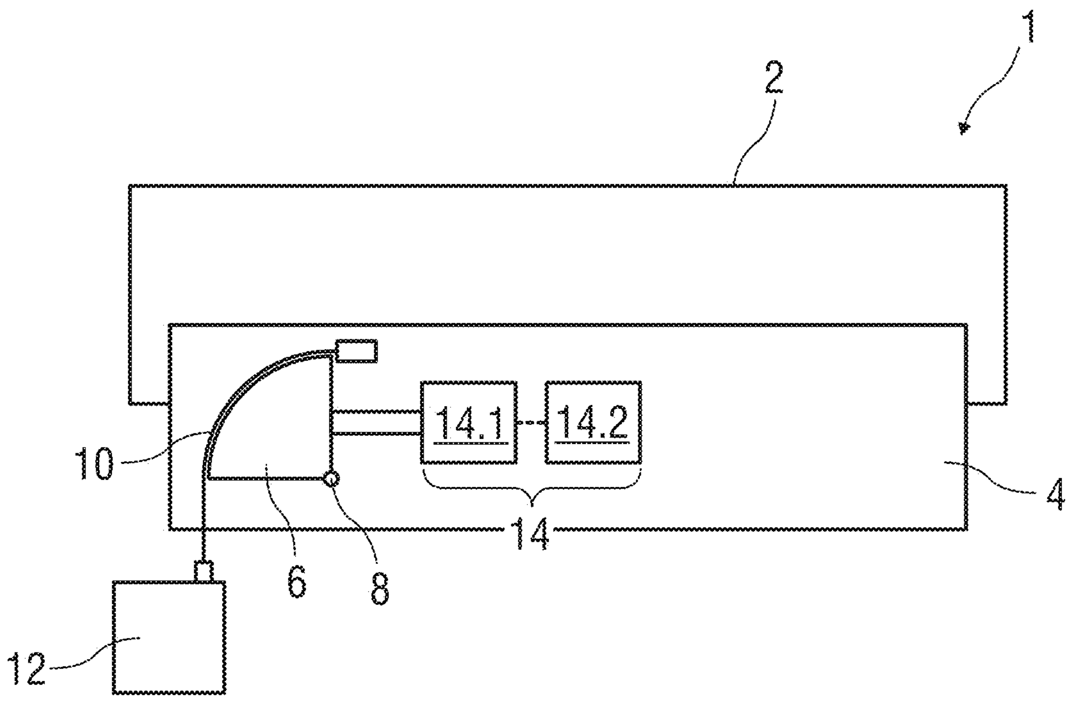
FIG. 1 schematically shows a door handle having a mass lock and a blocking device, FIG. 2 schematically shows a perspective view of the mass lock and the blocking device in their rest positions or starting positions, FIG. 3 schematically shows a further perspective view of the mass lock and the blocking device in their rest positions or starting positions, FIG. 4 schematically shows a perspective view of the mass lock in its locking position and the blocking device in its blocking position, and FIG. 5 schematically shows a further perspective view of the mass lock in its locking position and the blocking device in its blocking position.

FIG. 1 schematically shows a door handle 1 for a vehicle (not shown).

The door handle 1 is in particular an external door handle. The door handle 1 usually comprises a housing frame, which can in particular comprise a bearing frame or a handle support 2 for a handle element 4. The handle support 2 can be fastened to a door panel or another bearing bracket in a manner not shown in detail.

The handle element 4 is, among other things, articulated to the handle support 2. The handle element 4 is designed, for example, as a pull handle, a rotary handle, or a folding handle.

In addition, a deflection element 6 can be articulated to the handle support 2 and/or to the bearing bracket. The deflection element 6 is designed, for example, as a deflection lever, a deflection bracket, a deflection pulley, or the like. The deflection element 6 is mounted on the handle support 2 or on the bearing bracket so as to be pivotable about a deflection axis 8.

The handle element 4 and the deflection element 6 are in particular coupled to one another such that, upon actuation of the handle element 4, the deflection element 6 is also actuated. For example, the handle element 4 and the deflection element 6 can be designed in one piece. In particular, they can be designed as a molded component. Alternatively, the handle element 4 and the deflection element 6 can be designed as separate components.

A transmission element 10 is coupled to the deflection element 6. The transmission element 10 is designed, for example, as a Bowden cable.

A lock 12 is coupled to the end of the transmission element 10 opposite the deflection element 6, which lock can be actuated, in particular unlocked, via the deflection element 6 and the transmission element 10 upon actuation of the handle element 4.

Furthermore, a locking mechanism 14 is provided, which is designed such that it has a locking position 100 (shown in FIGS. 4 and 5), in which the deflection element 6 is or will be locked in a rest position 300 (shown in FIGS. 2 and 3) or a starting position, and a blocking position 200 (shown in FIGS. 4 and 5), in which the locking position 100 is or will be held securely.

In the locking position 100, the locking mechanism 14 thus blocks pivoting of the deflection element 6 into an unlocking position for the lock 12. By securely holding the locking position 100 in the blocking position 200 of the locking mechanism 14, the deflection element 6 remains blocked and the lock 12 is thus securely locked.

The locking mechanism 14 comprises at least one mass lock 14.1, which, in the event of an accident or impact, can be displaced into the locking position 100 on the deflection element 6 due to mass inertia, in particular automatically, for example by means of a stored force, for example a spring force, and wherein the locking mechanism 14 further comprises a blocking device 14.2, which irreversibly blocks the mass lock 14.1 in the locking position 100.

Such a locking mechanism 14 makes it possible in a simple manner for a mass lock 14.1 that has been triggered and is in its locking position 100 to be or remain blocked so that it cannot become disengaged or move out of its locking position 100. This can ensure that the vehicle door is prevented from being opened from the outside during an accident, but also after an accident.

Figure 2:
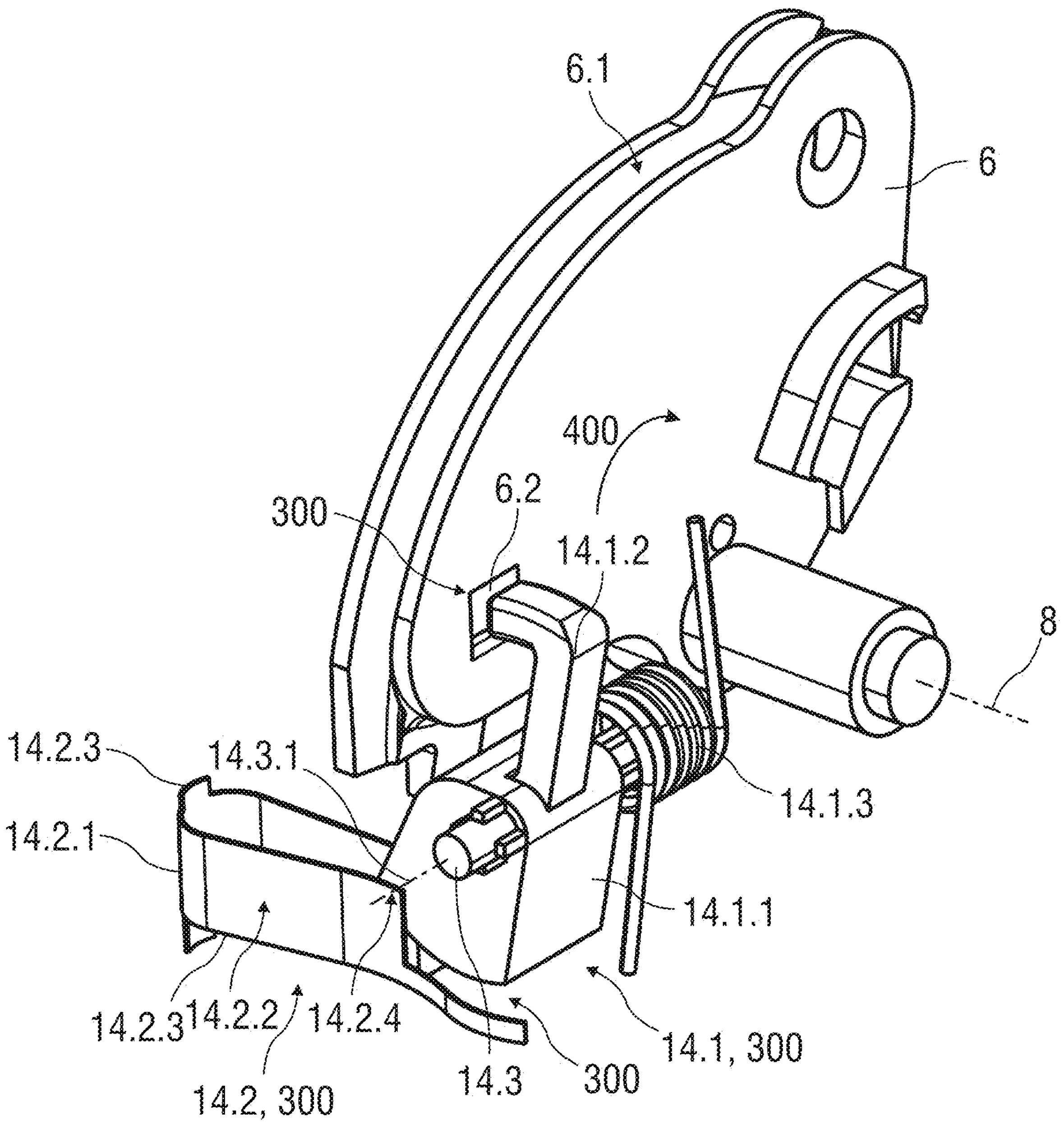
Figure 3:
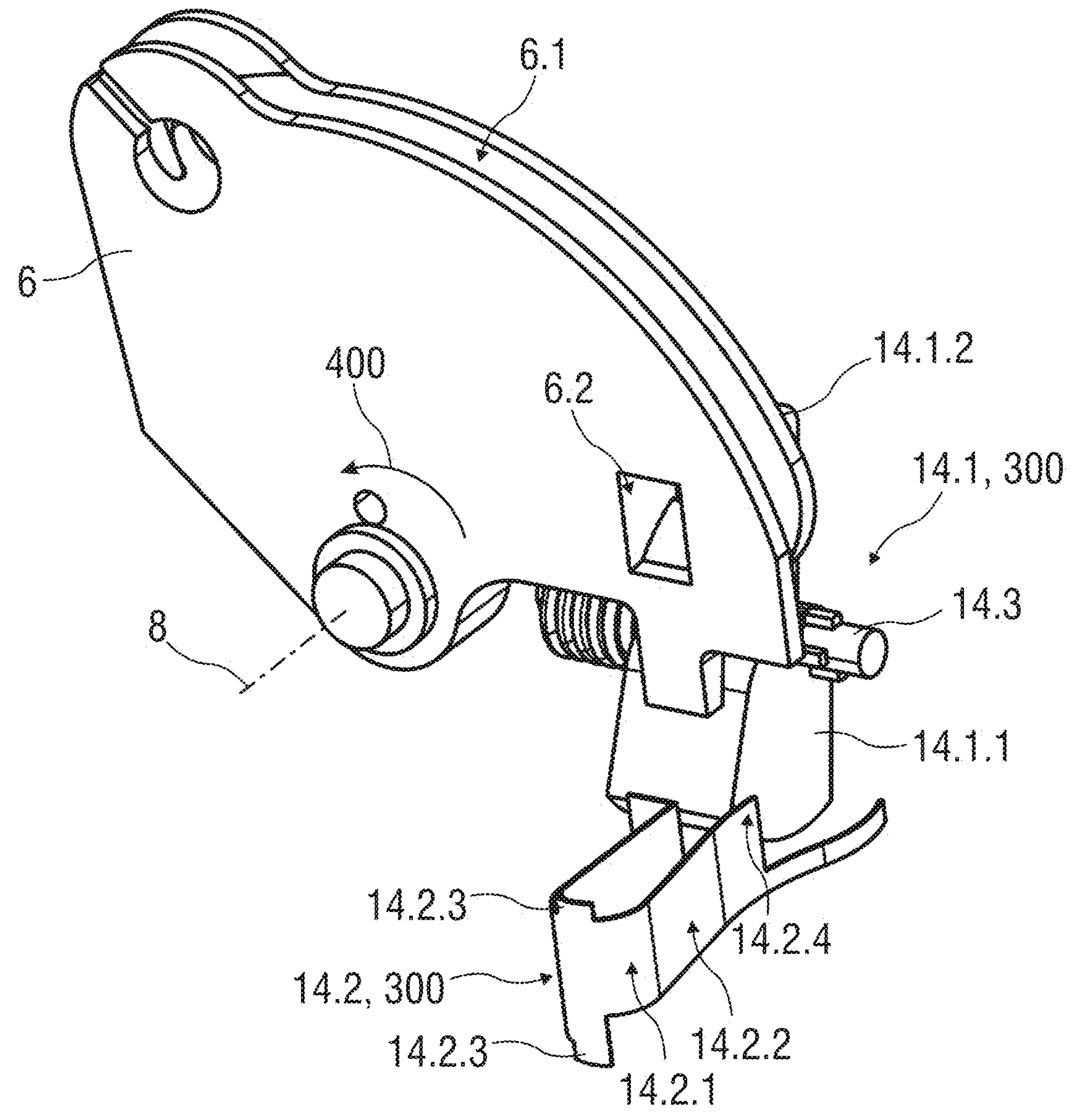

FIGS. 2 and 3 schematically show a perspective view of the mass lock 14.1 and the blocking device 14.2 in their rest positions 300 (called starting positions or normal positions).

In the rest position 300 of the mass lock 14.1, it is positioned relative to the deflection element 6, in particular at a distance therefrom, such that the mass lock 14.1 does not block the deflection element 6 and thus the transmission element 10 coupled thereto (shown in FIG. 1). It is thus possible to lock and unlock the lock 12 (shown in FIG. 1), in particular a door lock, by actuating the handle element 4 (shown in FIG. 1).

The deflection element 6 is designed, for example, as a deflection pulley, in particular a double pulley, with a guide seat 6.1 for the transmission element 10. The deflection element 6 is mounted on the handle support 2 or bearing bracket so as to be pivotable about the deflection axis 8. Arrow 400 indicates the unlocking direction of the unlocking movement of the deflection element 6 upon actuation of the handle element 4 in order to actuate, in particular to unlock, the lock 12 via the transmission element 10.

The deflection element 6 has a locking opening 6.2, in particular a through-opening, into which the mass lock 14.1 can engage in the locking position 100. In FIGS. 2 and 3, the mass lock 14.1 has not engaged in the locking opening 6.2.

The mass lock 14.1 is spring-loaded, for example by means of a spring element 14.1.3, on the handle support 2 (shown in FIG. 1) and/or on the bearing bracket or bearing frame. The mass lock 14.1 comprises a mass element 14.1.1 and a locking element 14.1.2. The mass lock 14.1 can be designed in one piece. The mass element 14.1.1 and the locking element 14.1.2 can be designed as a molded component. Alternatively, the mass element 14.1.1 and the locking element 14.1.2 may be separate components that are firmly connected to one another.

The mass lock 14.1 together with the locking element 14.1.2 is pivotally mounted on the handle support 2 or bearing frame or bearing bracket by means of a pivot bearing 14.3. In other words, the mass lock 14.1 together with the locking element 14.1.2 can engage in the locking position 100 (shown in FIGS. 4 and 5) on the deflection element 6.

The blocking device 14.2 is designed, for example, as a leaf spring 14.2.1 (also called flat spring). The leaf spring 14.2.1 can, for example, have a U-shape or an omega shape, or the like.

In the rest position 300 shown, the blocking device 14.2 is not in blocking engagement with the mass lock 14.1. In particular, the leaf spring 14.2.1 can be arranged in portions laterally of the mass element 14.1.1. At least one portion of a spring leg 14.2.2, for example, rests laterally on the mass lock 14.1 in a spring-loaded manner. In particular, the spring leg 14.2.2 extends perpendicularly to the locking axis 14.3.1 of the pivot bearing 14.3 of the mass lock 14.1 and at least in portions with an abutment portion 14.2.4 along an outer side of the mass lock 14.1, in particular of the mass element 14.1.1.

For holding the blocking device 14.2 on the handle support 2 or the bearing frame, the leaf spring 14.2.1 can have holding elements 14.2.3, in particular holding lugs or the like.

Figure 4:
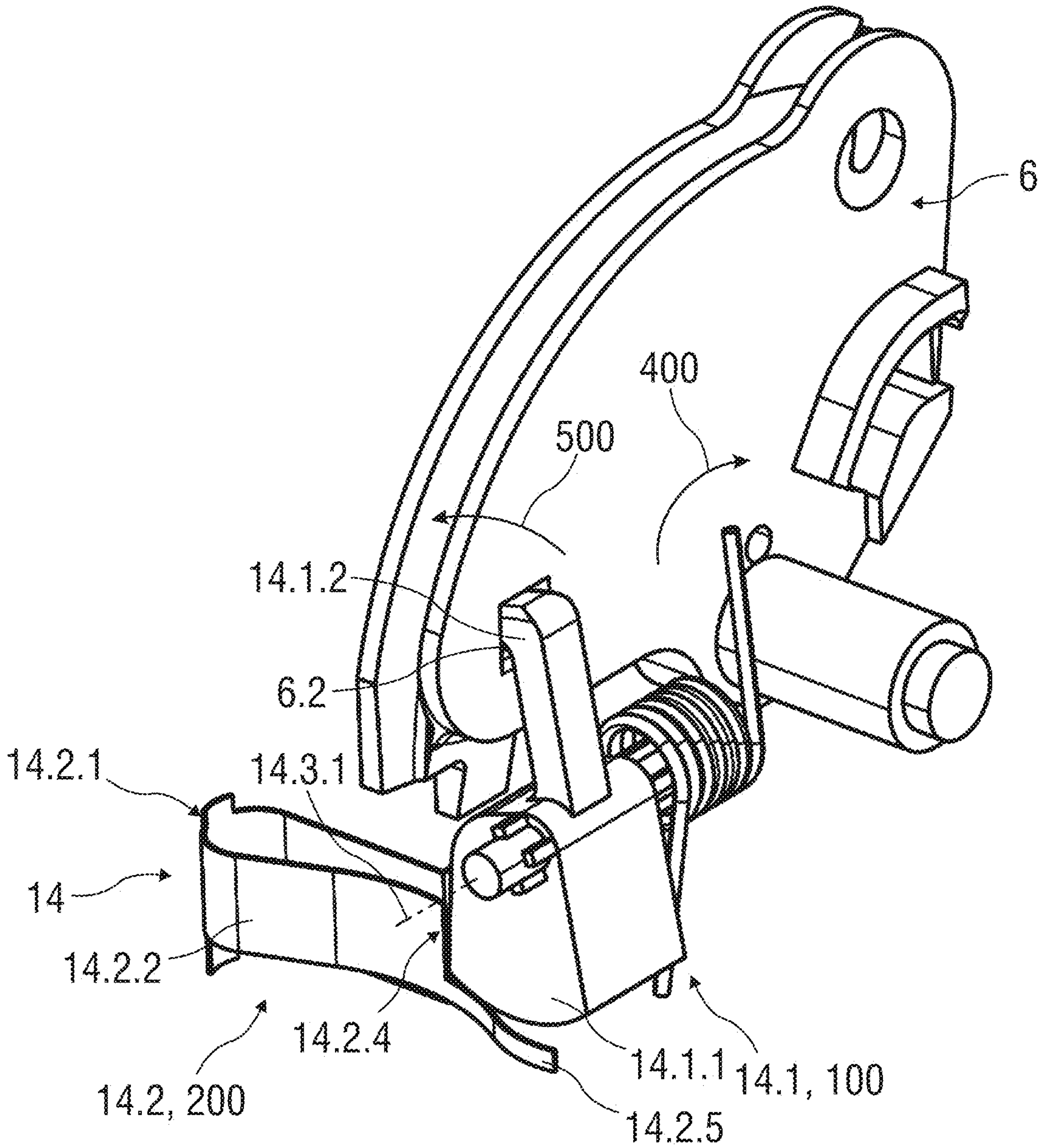
Figure 5:
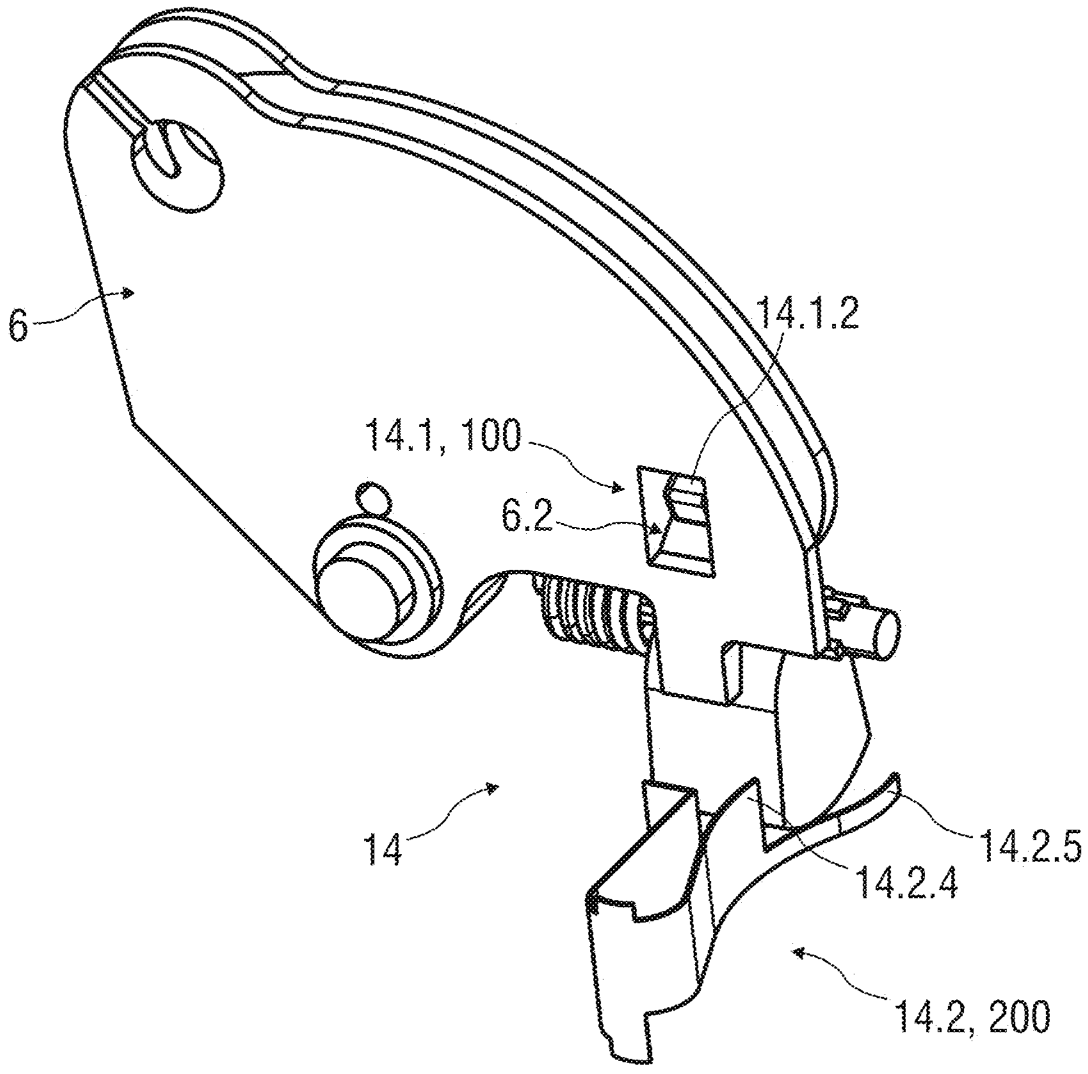

FIGS. 4 and 5 each schematically show a perspective view of the locking mechanism 14 with the mass lock 14.1 in its locking position 100 on the deflection element 6 and the blocking device 14.2 in its blocking position 200 on the mass lock 14.1.

If the door or the door handle 1 (shown in FIG. 1) is subjected to mechanical stress, for example in the event of an accident such as a side impact, the handle support 2 of the door handle 1 and/or the mass lock 14.1 may be pressed in or acted upon by mass forces or acceleration forces, whereby the mass lock 14.1 moves dynamically due to its mass inertia, in particular pivots about the locking axis 14.3.1 (=axis of rotation).

As a result, a locking surface, in particular the locking element 14.1.2 designed as a hook or nose, of the mass lock 14.1 comes into engagement with the locking opening 6.2 of the deflection element 6 and thus moves into the locking position 100 on the deflection element 6. In particular, the mass lock 14.1 pivots into the locking opening 6.2 in the engagement direction 500. As a result, the mass lock 14.1 blocks movement of the deflection element 6 and thus of the transmission element 10 in the unlocking direction according to arrow 400 so that unlocking of the lock 12 and thus opening of the door handle 1 is prevented.

As a result of the movement of the mass lock 14.1, the blocking device 14.2, in particular the spring-loaded leaf spring 14.2.1, moves into its blocking position 200 so that the mass lock 14.1 is irreversibly blocked in its locking position 100.

During the pivoting movement of the mass lock 14.1, the spring leg 14.2.2 moves from its lateral abutment on the mass element 14.1.1 so that the leaf spring 14.2.1 can expand.

An extension 14.2.5 protruding from the abutment portion 14.2.4 moves underneath the mass lock 14.1 and blocks it perpendicularly to the engagement direction 500. The abutment portion 14.2.4 blocks the mass lock 14.1 against the engagement direction 500 (also called locking direction). In other words, the abutment portion 14.2.4 ensures that the mass lock 14.1 cannot be moved from its locking position 100. The mass lock 14.1 is thus irreversibly blocked in its locking position 100 by means of the engaged blocking device 14.2, in particular the leaf spring 14.2.1, and cannot be released.

LIST OF REFERENCE SIGNS

1 Door handle
2 Handle support
4 Handle element
6 Deflection element
6.1 Guide seat
6.2 Locking opening
8 Deflection axis
10 Transmission element
12 Lock
14 Locking mechanism
14.1 Mass lock
14.1.1 Mass element
14.1.2 Locking element
14.1.3 Spring element
14.2 Blocking device
14.2.1 Leaf spring
14.2.2 Spring leg
14.2.3 Holding element
14.2.4 Abutment portion
14.2.5 Extension
14.3 Pivot bearing
14.3.1 Locking axis
100 Locking position
200 Blocking position
300 Rest position
400 Arrow
500 Engagement direction

The invention claimed is:

1. A door handle, comprising:
a handle element,
a deflection element,
a transmission element,
a locking mechanism for locking a lock, and
a handle support, to which the handle element and the deflection element are articulated,
wherein the transmission element is coupled to the deflection element, and
wherein, upon actuation of the handle element, the deflection element can be actuated and the lock can be unlocked thereby via the transmission element,
wherein the locking mechanism comprises at least one mass lock, which, due to an accident, can be displaced into a locking position on the deflection element due to mass inertia, and
wherein the locking mechanism further comprises a blocking device, which irreversibly blocks the mass lock in the locking position,
wherein in the locking position, an abutment portion of the locking mechanism is adapted to make blocking contact with a longitudinal side of the mass lock, and wherein in a rest position, the abutment portion is adapted to rest on a lateral side of the mass lock.

2. The door handle according to claim 1, wherein the mass lock comprises a unidirectional locking element and a mass element.

3. The door handle according to claim 2, wherein the locking element and the mass element are mounted so as to be rotatable about a common locking axis.

4. The door handle according to claim 2, wherein the locking element and the mass element are designed as a one-piece mass locking element.

5. The door handle according to claim 1, wherein the deflection element has a locking opening, into which the mass lock engages in a locking manner in the locking position.

6. The door handle according to claim 1, wherein, when the mass lock is brought into its locking position on the deflection element, the blocking device moves into a blocking position on the mass lock in order to irreversibly block the mass lock in its locking position.

7. The door handle according to claim 1, wherein the blocking device is designed as a leaf spring.

8. The door handle according to claim 7, wherein the leaf spring comprises a spring leg, which rests with the abutment portion laterally on the mass lock in a spring-loaded manner.

9. The door handle according to claim 8, wherein, when the mass lock is brought into its locking position, the spring leg automatically moves from its lateral abutment on the mass lock into a blocking position on the mass lock.

10. The door handle according to claim 9, wherein the spring leg comprises an extension, which, in the blocking position, irreversibly blocks the mass lock in its locking position.

11. The door handle according to claim 1, wherein in the locking position, an abutment portion of the locking mechanism makes blocking contact with a longitudinal side of the mass lock, and wherein in a rest position, the abutment portion rests on a lateral side of the mass lock.

* * * * *